United States Patent
Basu et al.

(10) Patent No.: US 12,536,040 B2
(45) Date of Patent: Jan. 27, 2026

(54) DATA SEQUENCE PREDICTION AND RESOURCE ALLOCATION

(71) Applicant: Micron Technology, Inc., Boise, ID (US)

(72) Inventors: Reshmi Basu, Boise, ID (US); David A. Palmer, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 946 days.

(21) Appl. No.: 17/463,601

(22) Filed: Sep. 1, 2021

(65) Prior Publication Data

US 2023/0066080 A1    Mar. 2, 2023

(51) Int. Cl.
     *G06F 9/46*      (2006.01)
     *G06F 9/50*      (2006.01)
     *G06N 3/04*      (2023.01)

(52) U.S. Cl.
     CPC .......... *G06F 9/5016* (2013.01); *G06F 9/5033* (2013.01); *G06F 9/5083* (2013.01); *G06N 3/04* (2013.01)

(58) Field of Classification Search
     CPC .... G06F 9/5016; G06F 9/5033; G06F 9/5083; G06N 3/04
     See application file for complete search history.

(56) References Cited

U.S. PATENT DOCUMENTS

| | | | |
|---|---|---|---|
| 8,825,784 B2 | 9/2014 | Ramnani | |
| 2002/0002705 A1 | 1/2002 | Byrnes et al. | |
| 2010/0144318 A1 | 6/2010 | Cable | |
| 2018/0011771 A1 | 1/2018 | Schimmelpfeng et al. | |
| 2019/0370714 A1* | 12/2019 | Liubyvyi | G06Q 10/0633 |
| 2020/0142466 A1* | 5/2020 | Naik | G06N 3/045 |
| 2020/0348974 A1* | 11/2020 | Gupta | G06F 9/5083 |
| 2021/0400460 A1* | 12/2021 | Han | H04W 24/08 |
| 2022/0179780 A1* | 6/2022 | Tavallaei | G06F 9/5016 |
| 2022/0343244 A1* | 10/2022 | Yesudas | G06N 5/04 |

* cited by examiner

*Primary Examiner* — Tammy E Lee

(74) *Attorney, Agent, or Firm* — Brooks, Cameron & Huebsch, PLLC

(57) ABSTRACT

A method for data sequence prediction and resource allocation includes determining, by a memory system, a plurality of resource parameters associated with operation of the memory system and determining respective time intervals associated with usage patterns corresponding to the memory system, the respective time intervals being associated with one or more sets of the plurality of resource parameters. The method further includes determining, using the plurality of resource parameters, one or more weights for hidden layers of a neural network for the respective time intervals associated with the usage patterns and allocating computing resources within the memory system for use in execution of workloads based on the determined one or more weights for hidden layers of the neural network.

18 Claims, 4 Drawing Sheets

DATA SEQUENCE PREDICTION AND RESOURCE ALLOCATION

TECHNICAL FIELD

The present disclosure relates generally to semiconductor memory and methods, and more particularly, to apparatuses, systems, and methods for data sequence prediction and resource allocation.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
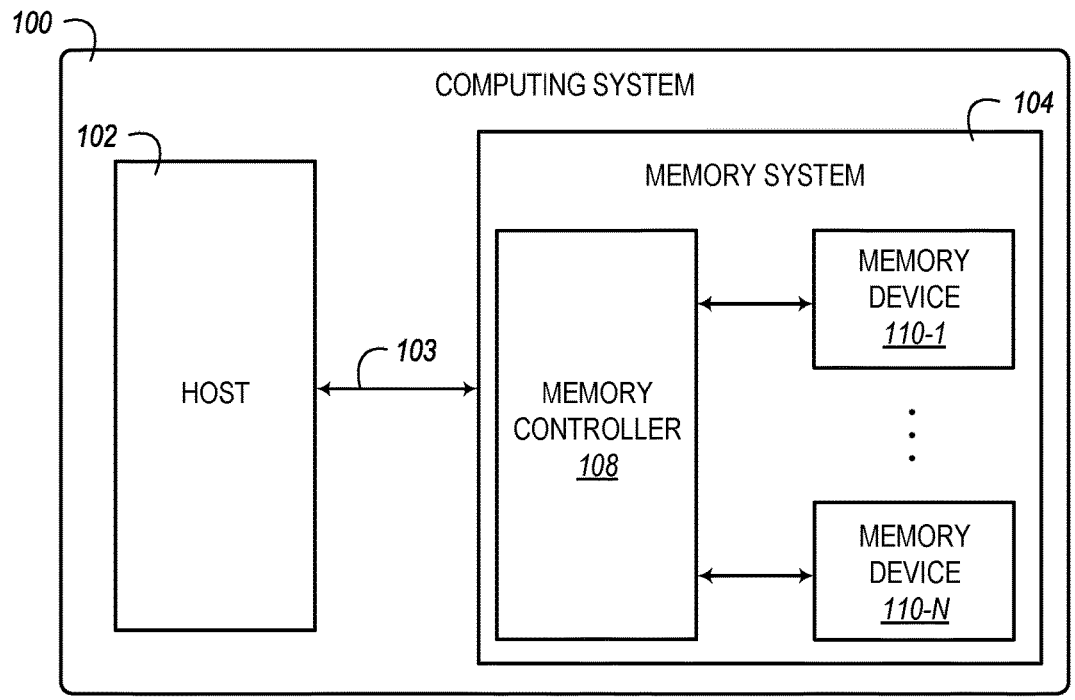
FIG. 1 is a functional block diagram in the form of a computing device including an apparatus including a host and a memory system in accordance with a number of embodiments of the present disclosure.

Methods, systems, and apparatuses for data sequence prediction and resource allocation are described herein. A method for data sequence prediction and resource allocation includes determining, by a memory system, a plurality of resource parameters associated with operation of the memory system and determining respective time intervals associated with usage patterns corresponding to the memory system, the respective time intervals being associated with one or more sets of the plurality of resource parameters. The method further includes determining, using the plurality of resource parameters, one or more weights for hidden layers of a neural network for the respective time intervals associated with the usage patterns and allocating computing resources within the memory system for use in execution of workloads based on the determined one or more weights for hidden layers of the neural network.

As telecommunications network (e.g., broadband cellular network) technology evolves, higher resource demands may be placed on devices connected to a telecommunications network. This can be due to increases in available bandwidth associated with telecommunications networks (referred to herein for brevity as "networks"), which can, in turn, give rise to higher download speeds and therefore increased data traffic associated with devices connected to the network. Such increased data traffic can further give rise a greater quantity of data received, stored, and/or processed within devices connected to the network.

In addition, the potential for increased data traffic involving devices, such as mobile computing devices, connected to the network can allow for increasingly complicated applications (e.g., computing applications that are designed to cause a computing device to perform one or more specific functions or tasks) to be executed on the devices. Execution of such applications can in turn give rise to demanding workloads, which can strain computing resources and, more specifically, strain computing resources that are allocated to such devices in some conventional approaches.

As used herein, the term "application" generally refers to one or more computer programs that can include computing instructions that are executable to cause a computing system to perform certain tasks, functions, and/or activities. An amount of computing resources (e.g., processing resources and/or memory resources) consumed in execution of an application can be measured in terms of a "workload." As used herein, the term "workload" generally refers to the aggregate computing resources consumed in execution of applications that perform a certain task, function, and/or activity. During the course of executing an application, multiple sub-applications, sub-routines, etc. may be executed by the computing system. The amount of computing resources consumed in executing the application (including the sub-applications, sub-routines, etc.) can be referred to as the workload.

As workloads become increasingly demanding, especially in light of improvements to telecommunications network technology and improvements to processing and/or memory resources available to process workloads, issues associated with optimization of workload handling can become further exacerbated in mobile computing devices (e.g., smartphones, tablets, phablets, and/or Internet-of-Things (IoT) devices, among others) where physical space constraints can dictate the amount of processing resources and/or memory resources available to the device. In addition, execution of demanding workloads using mobile computing devices can, in some approaches, quickly drain battery resources available to the mobile computing device and/or cause unwanted thermal behavior (e.g., the mobile computing device can become too hot to operate in a stable manner, etc.) for the mobile computing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to IoT devices, among other types of edge computing devices.

At least for the foregoing reasons, optimization of resources available to mobile computing devices to execute applications (e.g., instructions executable as part of one or more applications, etc.) running on a mobile computing device can become difficult due to the dynamic nature of mobile computing device usage, which can include evolving application and/or workload demands and/or the execution of new applications and/or workloads. It is therefore an objective of the present disclosure to optimize the computing resources (e.g., memory resources and/or processing resources) such instructions to improve the overall functioning of a computing device (e.g., a mobile computing device).

For example, as described herein, performance of a mobile computing device may be optimized based on predicting workloads that are to be executed by the mobile computing device based on workloads that are executed by the mobile computing device during given time intervals and proactively allocating computing resources for use in performance of future workloads. As used herein, the term "optimized" generally refers to a condition in which computing resources of the mobile computing device are allocated in a way that makes the best (or nearly the best) use of the computing resources for a particular purpose (e.g., for execution of particular types of workloads and/or for particular types of determined user behavior with respect to the mobile computing device).

As described in more detail, herein, these time intervals can correspond to an anticipated timeframe in the future during which various types of data traffic encumber the computing device. In some embodiments, such time intervals can be autocorrelation time intervals, which can be broken up into multiple predictive timeframes. As used herein, an "autocorrelation time interval" generally refers to a discrete period of time during which events can be monitored to determine a similarity between such events as a function of the time lag between the occurrence of similar events. Non-limiting examples of such events, which may be referred to herein in the alternative as "resource parameters," that can be monitored to determine a similarity therebetween as a function of time (e.g., during an autocorrelation time interval) can include memory device throughput, a percentage of observed dirty cache hits, a total quantity of write operations performed, a total quantity of erase operations performed, health characteristics of memory blocks and/or memory cells of the memory device, a quantity of free memory blocks and/or memory cells available, and/or whether data is being written sequentially or non-sequentially, among others.

As described in more detail herein, the autocorrelation time intervals and/or predictive timeframes can include at least a "current term prediction" time interval, a "short term prediction" time interval, a "medium term prediction" time interval, and/or a "long term prediction" time interval during which at least some of the example "similar events" described above occur. For example, a "current term prediction" time interval can refer to a time interval that is a shortest time interval between receipt and processing of data traffic and therefore can correspond to a time interval in which memory device parameters such as threshold voltage levels, cursor selection, and/or clock selection due to dynamic throughput, among others, may be of interest.

As used herein, the term "cursor" generally refers to a pointer or other indicator that serves to define a memory location in a memory device in which data is to be written. For example, a memory device may have blocks that operate in different bit per cell modes (e.g., a block in SLC mode and a block in TLC mode, etc.). At any given time, there may be several open blocks (partially but not completely filled and receiving more write data based on the workload) and each open block may be associated with some use case. For example, large sequential data may be written to an open TLC block, while small random data may be written to an open SLC block. Further, media management operations, such as data associated with garbage collection operation, may be written to a different TLC block, etc. A "cursor" can serve to keep track of locations in each open block where data has been previously written (or to where subsequent data can be written). In addition, a "cursor" can refer to how data writes can be segregated to various media into different data streams based on the use cases they are associated with. For example, a memory device may have different policies that could send one type of host write to one cursor or another based on a number of different factors (wear state, open/closed block counts, a type of write, etc.). Accordingly, the term "cursor selection" can generally refer to selection among various cursors that can be associated with these different policies and/or can be based on these different factors.

A "short term prediction" time interval can refer to a time interval on the order of minutes/hours to around one day between receipt and processing of data traffic and can therefore correspond to a time interval in which memory device parameters such as read ahead cache size allocation, buffer size allocation (e.g., between SRAM buffer and/or SLC/TLC NAND cells, etc.), logical-to-physical region management, media management operations, garbage collection cadence, and/or memory flushing operations, among other, may be of interest. A "medium term prediction" time interval can refer to a time interval on the order of several days between receipt and processing of data traffic and can therefore correspond to a time interval in which memory device parameters such as log status (e.g., whether or not to prematurely flush unmap logs and/or change logs), and/or pre-erasure of blocks of memory cells, among others, may be of interest. A "long term prediction" time interval can refer to a time interval on the order of months to years in which memory device characteristics such as utilization of back-end bandwidth, command queue collision avoidance, and/or wear leveling to maximize program-erase cycles and/or to minimize write amplification may be of interest.

In some embodiments, resources (e.g., memory resources and/or processing resources available to a computing device) can be allocated based on data sequences observed during these autocorrelation intervals. The data sequences observed during these intervals can be used as inputs to a neural network to optimize resource allocation in the computing device by predicting future resource requirements of the memory device and proactively allocating computing resources based on the predicted future resource requirements.

In general, a neural network can include a set of instructions that can be executed to recognize patterns in data. Some neural networks can be used to recognize underlying relationships in a set of data in a manner that mimics the way that a human brain operates. A neural network can adapt to varying or changing inputs such that the neural network can generate a best possible result in the absence of redesigning the output criteria.

A neural network can consist of multiple neurons, which can be represented by one or more equations. In the context of neural networks, a neuron can receive a quantity of numbers or vectors as inputs and, based on properties of the neural network, produce an output. For example, a neuron can receive $X_k$ inputs, with k corresponding to an index of input. For each input, the neuron can assign a weight vector, $W_k$, to the input. The weight vectors can, in some embodiments, make the neurons in a neural network distinct from one or more different neurons in the network. In some neural networks, respective input vectors can be multiplied by respective weight vectors to yield a value, as shown by Equation 1, which shows and example of a linear combination of the input vectors and the weight vectors.

$$f(x_1,x_2)=w_1x_1+w_2x_2 \qquad \text{Equation 1}$$

In some neural networks, a non-linear function (e.g., an activation function) can be applied to the value $f(x_1, x_2)$ that results from Equation 1. An example of a non-linear function that can be applied to the value that results from Equation 1 is a rectified linear unit function (ReLU). Application of the ReLU function, which is shown by Equation 2, yields the value input to the function if the value is greater than zero, or zero if the value input to the function is less than zero. The ReLU function is used here merely used as an illustrative example of an activation function and is not intended to be limiting. Other non-limiting examples of activation functions that can be applied in the context of neural networks can include sigmoid functions, binary step functions, linear activation functions, hyperbolic functions, leaky ReLU functions, parametric ReLU functions, softmax functions, and/or swish functions, among others.

$$\text{ReLU}(x)=\max(x,0) \qquad \text{Equation 2}$$

During a process of training a neural network, the input vectors and/or the weight vectors can be altered to "tune" the network. In one example, a neural network can be initialized with random weights. Over time, the weights can be adjusted to improve the accuracy of the neural network. This can, over time yield a neural network with high accuracy, as described in connection with FIG. 3, herein.

However, in accordance with some aspects of the present disclosure, a neural network can receive as inputs various memory device resource parameters, such as memory device throughput, a percentage of observed dirty cache hits, a total quantity of write operations performed, a total quantity of erase operations performed, health characteristics of memory blocks and/or memory cells of the memory device, a quantity of free memory blocks and/or memory cells available, and/or whether data is being written sequentially or non-sequentially, among others. The neural network can then perform data sequence and correlation (e.g., autocorrelation) to determine hidden layers (or "weights") for the neural network. These hidden layers can in turn be used to determine weighted resource allocation parameters that are used to predict future resource allocation requirements for a computing system in which the memory device is deployed. By performing these and other operations described herein, resources of the computing system can be proactively allocated to optimize performance, device lifetime, and/or power consumption, among others, of the computing system.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X," "N," "M" "O," "P," Q," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 110-1 to 110-N (or, in the alternative, 110-1, . . . , 110-N) may be referred to generally as 110. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing device 100 including an apparatus including a host 102 and a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a one or more memory modules (e.g., single in-line memory modules, dual in-line memory modules, etc.). The memory system 104 can include volatile memory and/or non-volatile memory. In some embodiments, the computing system 100 can be a mobile computing device, such as a personal laptop computer, a digital camera, a smart phone, a memory card reader, and/or an internet-of-things (IoT) enabled device, as described herein.

The computing system 100 can include a system motherboard and/or backplane and can include and can include a memory access device, e.g., a processor (or processing unit), as described below. The computing system 100 can include separate integrated circuits or one or more of the host 102, the memory system 104, the memory controller 108, and/or the memory devices 110-1 to 110-N can be on the same integrated circuit. Although the example shown in FIG. 1 illustrates a computing device 100 having a Von Neumann architecture, embodiments of the present disclosure can be implemented in non-Von Neumann architectures, which may not include one or more components (e.g., CPU, ALU, etc.) often associated with a Von Neumann architecture.

As shown in FIG. 1, the host 102 can be coupled to the memory system 104 via one or more channels (e.g., channel 103). As used herein, a "channel" generally refers to a communication path by which signaling, commands, data, instructions, and the like are transferred between the host 102, the memory system 104, the memory controller 108, and/or the memory devices 110-1 to 110-N. Although not shown in FIG. 1 so as to not obfuscate the drawings, the memory devices 110-1 to 110-N can be coupled to the memory controller 108 and/or to the host 102 via one or more channels such that each of the memory devices 110-1 to 110-N can receive messages, commands, requests, protocols, data, or other signaling that is compliant with the type of memory associated with each of the memory devices 110-1 to 110-N.

The memory system 104 can, in some embodiments, be a universal flash storage (UFS) system. As used herein, the term "universal flash storage" generally refers to a memory system that is compliant with the universal flash storage specification that can be implemented in digital cameras, mobile computing devices (e.g., mobile phones, etc.), and/or other consumer electronics devices. In general, a UFS system utilizes one or more NAND flash memory devices such as multiple stacked 3D TLC NAND flash memory dice in conjunction with an integrated controller (e.g., the memory controller 108).

The memory system 104 can include volatile memory and/or non-volatile memory. In a number of embodiments, the memory system 104 can include a multi-chip device. A multi-chip device can include a number of different memory devices 110-1 to 110-N, which can include a number of different memory types and/or memory modules. For example, a memory system 104 can include non-volatile or volatile memory on any type of a module. In addition, as shown in FIG. 1, the memory system 104 can include a storage controller 108. Each of the components (e.g., the memory system 104, the memory controller 108, and/or the memory devices 110-1 to 110-N can be separately referred to herein as an "apparatus." The memory controller 108 may be referred to as a "processing device" or "processing unit" herein.

The memory system 104 can provide main memory for the computing system 100 or could be used as additional memory and/or storage throughout the computing system 100. The memory system 104 can include one or more memory devices 110-1 to 110-N, which can include volatile and/or non-volatile memory cells. At least one of the memory devices 110-1 to 110-N can be a flash array with a NAND architecture, for example. Embodiments are not limited to a particular type of memory device. For instance, the memory system 104 can include RAM, ROM, DRAM, SDRAM, PCRAM, RRAM, and flash memory, among others.

In embodiments in which the memory system 104 includes non-volatile memory, the memory system 104 can include any number of memory devices 110-1 to 110-N that can include flash memory devices such as NAND or NOR flash memory devices. Embodiments are not so limited, however, and the memory system 104 can include other non-volatile memory devices 110-1 to 110-N such as non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

In some embodiments, the memory devices 110-1 to 110-N include different types of memory. For example, the memory device 110-1 can be a non-volatile memory device, such as a NAND memory device, and the memory device 110-N can be a volatile memory device, such as a DRAM device, or vice versa. Embodiments are not so limited, however, and the memory devices 110-1 to 110-N can include any type and/or combination of memory devices.

The memory system 104 can further include a memory controller 108. The memory controller 108 can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the memory controller 108 can comprise one or more processors (e.g., processing device(s), processing unit(s), etc.).

In some embodiments, the memory controller 108 can control access to the memory devices 110-1 to 110-N. For example, the memory controller 108 can process signaling corresponding to memory access requests (e.g., read and write requests involving the memory devices 110-1 to 110-N) and cause data to be written to and/or read from the memory devices 110-1 to 110-N. Embodiments are not so limited, however, and in some embodiments, the memory controller 108 can monitor resources parameters associated with the memory system 104, control performance of data sequencing operations, data correlation operations, and/or weighted resource allocation operations utilizing a neural network (e.g., the neural network 322 illustrated in FIG. 3, herein), and/or control performance of operations to allocate (re-allocate, pre-allocate, etc.) resources amongst the memory devices 110-1 to 110-N in response to performance of the above-enumerated operations.

In addition, the memory controller 108 can process signaling corresponding to workloads and application usage associated with the computing system 100. For example, the memory controller 108 can monitor characteristics of workloads executed by the computing system 100 to determine if a current workload and/or application usage is optimized for the computing system 100. If the memory controller 108 determines that the workload and/or application usage are not optimized based on the resource parameters and weighted outputs of a neural network (e.g., the neural network 322 illustrated in FIG. 3, herein) for the computing system 100, the memory controller 108 can proactively allocate computing resources amongst the memory devices 110-1 to 110-N to optimize performance of subsequent workloads and/or applications and/or to optimize the resource parameters associated with the computing system 100. In addition to, or in the alternative, the memory controller 108 can cause updated operational instructions (e.g., firmware updates) to be retrieved from circuitry external to the computing system 100 and executed by the computing system 100 to optimize performance of the computing system 100 (e.g., to proactively allocate computing resources) based on the characteristics of the workloads executed by the computing system 100 and/or the resource parameters.

As discussed in more detail in connection with FIGS. 2 and 4, herein, the memory controller 108 can communicate with circuitry external to the computing device 100 as part of performing the operations described herein. For example, the memory controller 108 can transfer and receive signaling via a telecommunications network, such as the telecommunications network 450 illustrated in FIG. 4. In some embodiments, the signaling transferred and received by the memory controller 108 can include commands corresponding to resource parameters and/or other instructions that can be executed by the memory controller 108 to optimize computing resource allocation for the computing device 100, as described herein.

In some embodiments, the memory controller 108 can execute instructions corresponding to data pattern recognition. For example, the memory controller 108 can execute instructions that can cause the computing device 100 to monitor resource parameters associated with workloads, executed applications, types of applications executed, etc. that are processed by the computing device 100 to determine patterns associated with the resource parameters. In some embodiments, the resource parameters can be used by the memory controller 108 to predict and/or determine likely future data processing trends of the computing device 100. The memory controller 108 can then use the predicted resource parameter trends to optimize allocation of computing resources amongst the memory devices 110-1 to 110-N preemptively and/or dynamically.

In a non-limiting example, an apparatus (e.g., the computing system 100) can include a memory system 104 that includes the memory devices 110-1 to 110-N. A processing unit (e.g., the memory controller 108) can be resident on the memory system 104. In some embodiments, the memory system, the memory devices, and/or the processing unit can be resident on a mobile computing device. As used herein, the term "resident on" generally refers to something that is physically located on a particular component, die, chip, circuit board, and/or substrate, among other possibilities. For example, the processing unit being resident on the memory system 104 generally refers to a condition in which the physical hardware (e.g., the circuitry, logic, or other hardware components) that form the processing unit are physically contained within the memory system 104 (i.e., within a same die or package). The term "resident on" may be used interchangeably with other terms such as "deployed on" or "located on," herein.

The processing unit can be communicatively coupled to the memory devices and the processing unit can monitor resource parameters corresponding to execution of applications involving the memory system. In some embodiments, the memory devices can include at least one volatile memory device and at least one non-volatile memory device.

The processing unit can determine usage patterns associated with the memory system based on the monitored resource parameters corresponding to execution of the applications. The processing unit can determine respective time intervals associated with the monitored resource parameters. In some embodiments, the respective time intervals can be associated with particular resource parameters among the monitored resource parameters. As described above, the time intervals can be autocorrelation time intervals.

The processing unit can determine, using at least one monitored resource parameter among the monitored resource parameters and/or the determined usage patterns one or more weights for hidden layers of a neural network (e.g., the neural network 322 described in connection with FIG. 3, herein) for the respective time intervals that are associated with the determined usage patterns. Accordingly, in some embodiments, the hidden layers of the neural network can correspond to hidden layers of a feed-forward neural network, such as a recurrent neural network. As described in more detail herein, the usage patterns can correspond to a user workload (e.g., the user workload 321 of FIG. 3) and/or an aggregate user workload (e.g., the aggregate cloud workload 323 of FIG. 3).

In some embodiments, the processing unit can allocate computing resources within the memory system for use in execution of subsequent applications based on the determined one or more weights corresponding to the hidden layers of the neural network. In such embodiments, the processing unit can allocate computing resources amongst the volatile memory device(s) and/or the non-volatile memory device(s) as part of allocation of the computing resources for use in execution of applications that are executed subsequent to applications.

As described below, the processing unit can determine individual user application parameters corresponding to applications executed by a user of the computing system 100 (e.g., parameters corresponding to the user workload 321 of FIG. 3), receive aggregate workload parameters corresponding to applications executed by other users connected to a network to which the computing system 100 is connected (e.g., parameters corresponding to the aggregate cloud workload 323 of FIG. 3) and determine characteristics of the resource parameters using the determined individual user application parameters and the received aggregate workload parameters.

Continuing with this non-limiting example, the processing unit can to determine a command latency associated with commands corresponding to execution of the applications to determine the respective time intervals associated with the resource parameters (e.g., the individual user application parameters 321 corresponding to applications executed by a user of the computing system 100 and/or the aggregate workload parameters 323 corresponding to applications executed by other users connected to a network to which the computing system 100 is connected).

In some embodiments, the processing unit can determine and/or assign at least three distinct time intervals as part of determining the usage patterns associated with the memory system. As described herein, these time intervals can be autocorrelation time intervals and can be based on the monitored resource parameters corresponding to execution of the applications running on the computing system 100. In such examples, the processing unit can determine and/or assign a first distinct time interval that corresponds to a current term, a second distinct term that corresponds to a short term, and/or a third distinct term that corresponds to a medium term or a long term. Embodiments are not so limited, however, and the processing unit can determine and/or assign greater than three distinct time intervals or fewer than three distinct time intervals. For example, in some embodiments, the processing unit can determine and/or assign four distinct time intervals: a first distinct time interval that corresponds to a current term, a second distinct term that corresponds to a short term, a third distinct term that corresponds to a medium term, and a fourth distinct time interval that corresponds to a long term.

The embodiment of FIG. 1 can include additional circuitry that is not illustrated so as not to obscure embodiments of the present disclosure. For example, the memory device 104 can include address circuitry to latch address signals provided over I/O connections through I/O circuitry. Address signals can be received and decoded by a row decoder and a column decoder to access the memory device 104 and/or the memory array 130. It will be appreciated by those skilled in the art that the number of address input connections can depend on the density and architecture of the memory device 104 and/or the memory array 130.

Figure 2:
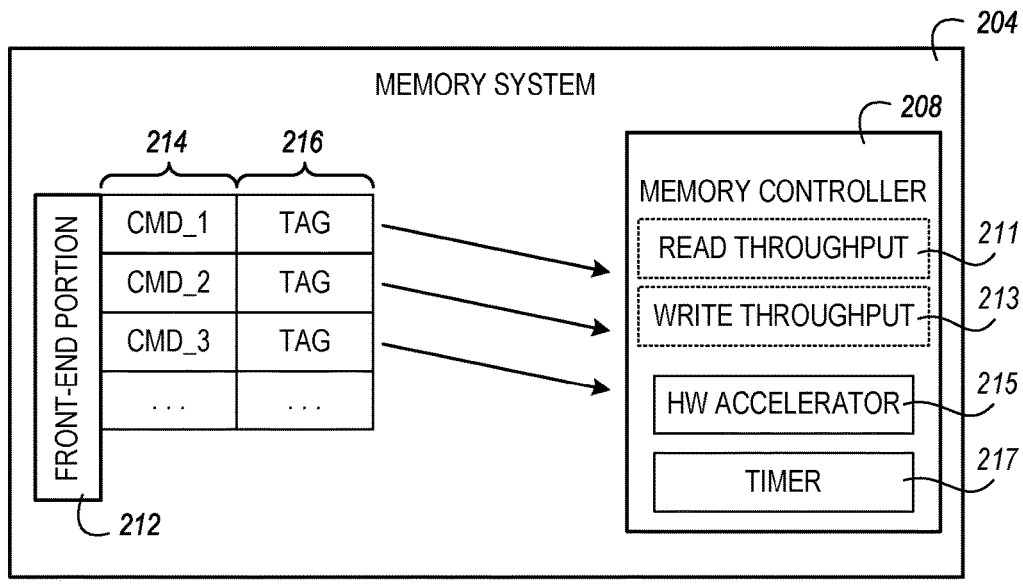
FIG. 2 is a functional block diagram in the form of a memory system including a front-end portion and a memory controller in accordance with a number of embodiments of the present disclosure.

FIG. 2 is a functional block diagram in the form of a memory system 104 including a front-end portion 212 and a memory controller 208 in accordance with a number of embodiments of the present disclosure. As shown in FIG. 2, the memory system 104 includes a front-end portion and a memory controller 208, which can be analogous to the memory controller 108 illustrated in FIG. 1, herein. The memory controller 208 illustrated in FIG. 2 can include hardware acceleration circuitry (the "HW ACCELERATOR" 215) and/or timing circuitry (the "TIMER" 217). In addition, the memory controller 208 can monitor various resource parameters such as read throughput 211 and write throughput 213. It will be appreciated that these enumerated examples are not intended to be limiting and the memory controller 208 can monitor other resource parameters, as described in more detail herein.

The front-end portion 212 can be configured to receive signaling, which can be referred to as a command 214 (e.g., CMD_1, CMD_2, CMD_3, etc.), from a host, such as the host 102 illustrated in FIG. 1. The front-end portion 212 can control the order in which such signaling is processed. That is, in some embodiments, the front-end portion 212 can include queuing circuitry to organize and control the order in which signaling received from the host is handled with respect to the memory system 204. In some embodiments, the front-end portion 212 can append a tag 216 to each of the received commands 214. Although the tags 216 are generically shown in FIG. 2, embodiments are not so limited and each of the tags 216 can be the same or different from at least one of the other tags 216.

The tags 216 can include information corresponding to application initiation latency, resource parameters, autocorrelation time intervals, workload parameters, data sequence parameters and/or data correlation parameters, and/or weighted resource allocation parameters, among others. In addition, the tags 216 can include information corresponding to the time dependent terms (e.g., current term, short term, medium term, and/or long term, etc.) described herein.

In some embodiments, the current term, short term, medium term, and/or long term time intervals can be based on an amount of time experienced by the computing system at which particular management operations are performed. For example, the current term, short term, medium term, and/or long term time intervals can be based on the frequency at which management operations such as threshold read/write voltage levels, cursor selection, clock timing selection corresponding to dynamic throughput, read ahead cache size allocation, buffer size allocation, logical-to-physical region management, media management operations, such as garbage collection cadence, memory flushing operations, log flushing operations, pre-erasure of blocks of memory cells, utilization of back-end bandwidth, command queue collision avoidance, wear leveling operations, etc.

While these and other management operations are generally performed at set intervals in some approaches, embodiments of the present disclosure can allow for resource parameters of the computing system to monitored with knowledge of the timeframes in which these and other such operations are generally performed to facilitate the data sequence prediction and resource allocation methodologies described herein. Accordingly, as described herein, aspects of the present disclosure can facilitate preemptive allocation of computing resources to optimize performance of a computing system.

Figure 4:
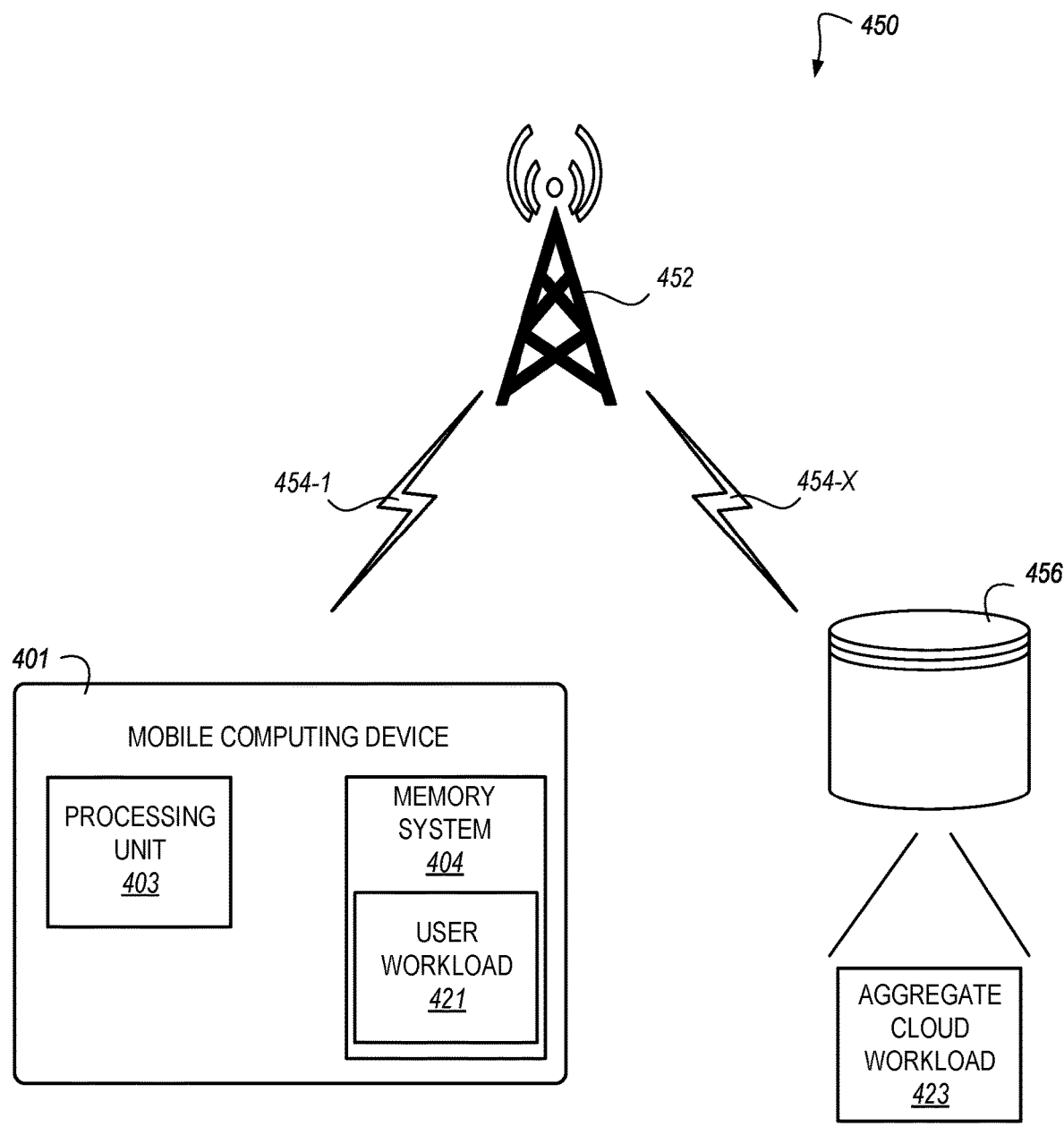
FIG. 4 is an example of a telecommunications network including a base station, a data center and a mobile computing device in accordance with some embodiments of the present disclosure.

In some embodiments, the current term, short term, medium term, and/or long term time intervals can be based on an amount of time subsequent to a first initiation of a computing system (e.g., the computing system 100 illustrated in FIG. 1 and/or the mobile computing device 401 illustrated in FIG. 4). For example, the current term, short term, medium term, and/or long term time intervals can be based on an amount of time subsequent to first initiation (or any subsequent initialization) of a computing system in which certain operations may be performed to optimize resource allocation of the computing system. In such embodiments, current term, short term, medium term, and/or long term time intervals can be based on an amount of time, wear, PECs, environmental operating conditions, etc. that components (e.g., the components of the memory system 104, 204 illustrated in FIGS. 1 and 2, herein) of the computing system have experienced as a result of workloads experienced in execution of applications using the computing system.

Figure 3:
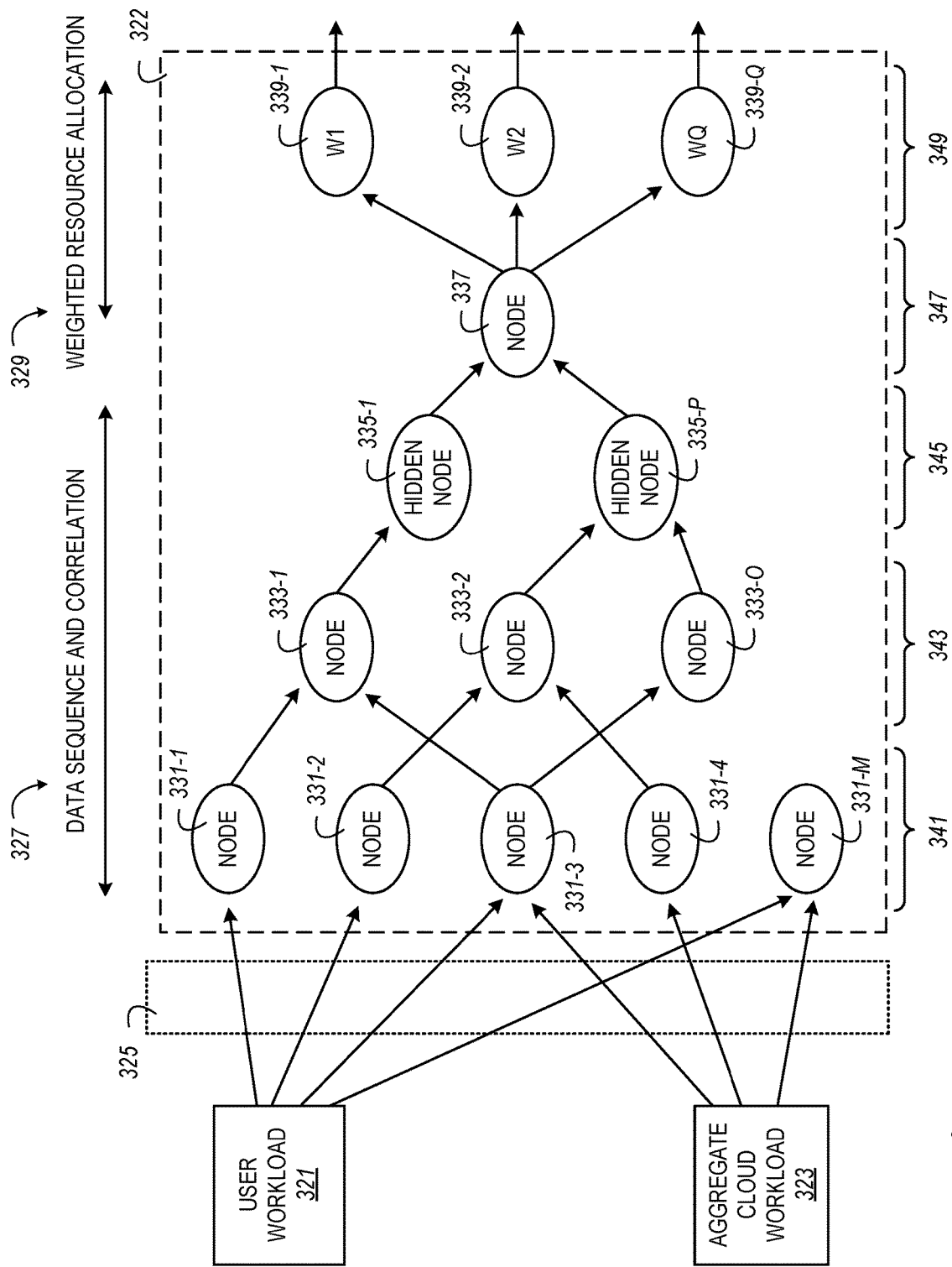
FIG. 3 is an example neural network for data sequence prediction and resource allocation in accordance with a number of embodiments of the present disclosure.

FIG. 3 is an example neural network 322 for data sequence prediction and resource allocation in accordance with a number of embodiments of the present disclosure. In some embodiments, the neural network 322 can be a feed-forward neural network, such as a recurrent neural network (RNN). Embodiments are not so limited, however, and the neural network 322 can be a different type of feed-forward neural network or a back-propagation neural network. For example, the neural network 322 can a perceptron neural network, a radial basis neural network, a deep feed forward neural network, a recurrent neural network, a long/short term memory neural network, a gated recurrent unit neural network, an auto encoder (AE) neural network, a variational AE neural network, a denoising AE neural network, a sparse AE neural network, a Markov chain neural network, a Hopfield neural network, a Boltzmann machine (BM) neural network, a restricted BM neural network, a deep belief neural network, a deep convolution neural network, a deconvolutional neural network, a deep convolutional inverse graphics neural network, a generative adversarial neural network, a liquid state machine neural network, an extreme learning machine neural network, an echo state neural network, a deep residual neural network, a Kohonen neural network, a support vector machine neural network, and/or a neural Turing machine neural network, among others.

The neural network 322 illustrated in FIG. 3 can be entirely or partially contained within a computing system, such as the computing system 100 illustrated in FIG. 1. For example, the neural network 322 can be written to memory devices, such as the memory devices 100-1 to 110-N of the memory system 104 illustrated in FIG. 1 and operations involving the neural network 322 can be performed while data corresponding to the neural network 322 is written to the memory devices. In some embodiments, operation of the neural network 322 (e.g., control of operations performed utilizing the neural network 322) can be orchestrated by a memory controller, such as the memory controller 108 illustrated in FIG. 1.

As shown in FIG. 3, workloads corresponding to a user workload 321 and workloads corresponding to aggregate cloud workloads 323, as well as resource parameters 325, can be used as inputs (shown by the directional arrows) for the neural network 322. The arrows shown between the layers 341, 343, 345, 347, and 349 can represent weights ascribed to nodes 331, 333, 335, 337, and/or 339 of the neural network 322. In some embodiments, the directional arrows can correspond to weights of various branches of the neural network 322. For example, during the data sequence and correlation phase 327, the arrow pointing from the node 331-1 the arrow pointing from the node 331-3 to the node 333-1 can represent weights of the neural network 322. In some embodiments, the arrows can represent different weights which can, for example, be different based on the resource parameters used as inputs to the nodes 331, 333, etc. and/or can be different based on a term (e.g., whether a current term, a short term, a medium term, and/or a long term prediction is being processed by the neural network 322.

The user workload 321 can correspond to workloads that are being executed, or have been executed, by a computing device (e.g., the computing device 100 and/or the mobile computing device 401 illustrated in FIGS. 1 and 4, respectively). As used herein, the term "user workload" generally refers to workloads that arise from execution of applications using computing resources of the computing system 100 of FIG. 1 and/or the mobile computing device 401 of FIG. 4. In some embodiments, the user workload 321 can be monitored by the computing device (e.g., by the memory controller 108 illustrated in FIG. 1, herein) and/or can be monitored by computing resources available to a distributed computing system in communication with the computing to determine characteristics associated with execution of the workloads. In some embodiments, the characteristics associated with execution of the workloads can include types of applications (e.g., camera/video applications, gaming applications, financial applications, social media applications, health applications, etc.) executed by the computing device, power consumption (e.g., battery consumption) associated with execution of the workload(s), and/or frequency of execution of the workload(s), among others.

The aggregate cloud workloads 323 can be collected from a set of different computing devices to which the computing system 100 of FIG. 1 is communicatively coupled. For example, a distributed computing system (e.g., a multi-user network, cloud computing system, etc.), as represented by the telecommunication network 450 shown in FIG. 4, can be in communication with multiple computing devices, including the computing system 100, and can be configured to retrieve information corresponding to execution of applications and corresponding workloads associated with the set of computing devices that are in communication with the distributed computing system and/or the computing system 100. Such information can be communicated via a wireless communication path (e.g., an "over-the-air" communication path, such as the communication paths 454-1 to 454-X illustrated in FIG. 4, herein), such as a wireless Internet connection and/or cellular network connection and can be processed, analyzed, and/or stored as part of the aggregate cloud workload 323.

As shown in FIG. 3, the neural network 322 includes multiple layers 341, 343, 345, 347, 349, that can each include a quantity of nodes 331, 333, 335, 337, 339. In some embodiments, at least some of the layers 341, 343, 345, 347, 349 and, therefore at least some of the nodes 331, 333, 335, 337, 339, can be input layers/nodes, hidden layers/nodes, and output layers/nodes.

For example, in the embodiment illustrated in FIG. 3, the layer 341 can be an input layer that includes input nodes 331 that receive information regarding the user workload 321, the aggregate cloud workload 323, and/or the resource parameters 325. The layer 345 can be a hidden layer that includes the hidden nodes 335, and the layer 349 can be an output layer that includes the nodes 339. The layer 343 (which includes the nodes 333) and the layer 347 (which includes the node 337) can represent various intermediate layers of the neural network 332. In some embodiments, the layer 349 can include weighted outputs W1 339-1, W2 339-2, WQ 339-Q, etc. of the neural network 322. As described herein, computing resources within the memory system can be pre-allocated for use in execution of future workloads based on the determined weights for hidden layers (e.g., the layer 345) of the neural network and/or based on weighted outputs W1 339-1, W2 339-2, WQ 339-Q, etc. of the neural network 322.

The neural network 322 can be trained and/or operated in one or stages. For example, operations involving the layers 341, 343, and 345 can be performed during a data sequence and correlation stage 327 and operations involving the layers 347 and 349 can be performed during a weighted resource allocation stage 329. The operations can include inputting information corresponding to resource parameters, such as those associated with the user workload 321, and/or the aggregate cloud workload 323, weighting the inputs to determine hidden layers of the neural network 322, performing feature extraction, and/or determining the weighted outputs W1 339-1, W2 339-2, WQ 339-Q, etc.

In some embodiments, the operation consisting of inputting information corresponding to resource parameters, such as those associated with the user workload 321, and/or the aggregate cloud workload 323, weighting the inputs to determine hidden layers of the neural network 322, and/or performance of feature extraction can occur during the data sequence and correlation stage 327, while determining the weighted outputs W1 339-1, W2 339-2, WQ 339-Q, etc. can occur during the weighted resource allocation stage 329.

FIG. 4 is an example of a telecommunications network 450 including a base station 452, a data center 456 and a mobile computing device 401 in accordance with some embodiments of the present disclosure. The base station can be in communication with the mobile computing device 401 and the data center 456 via "over-the-air" communication paths 454-1 to 454-X. The base station 452 may provide network coverage for a number of devices, such as mobile computing devices. As used herein, the term "network coverage," particular in the context of network coverage from a base station, generally refers to a geographical area that is characterized by the presence of electromagnetic radiation (e.g., waves having a particular frequency range associated therewith) generated by a base station. As used herein, a "base station" generally refers to equipment that generate and receive electromagnetic radiation within a particular frequency range and facilitate transfer of data or other information between the base station and computing devices (e.g., mobile computing devices such as smartphones, etc.) that are within the network coverage area of the base station. Several non-limiting examples of frequency ranges that a base station can generate and receive can include 700 MHz-2500 MHz (in the case of a 4G base station) or 28 GHz-39 GHz (in the case of a 5G base station).

In a non-limiting example, a system can include a base station 452 and a data center 456. A mobile computing device 401 can be communicatively coupled to the base station 452 via the communication path 454-1. As shown in FIG. 4, the mobile computing device 401, which can be analogous to the computing system 100 illustrated in FIG. 1, herein, can have a processing unit 403 and a memory system 404 resident thereon. In some embodiments, the processing unit 403 can be analogous to the memory controller 108/208 illustrated in FIGS. 1 and 2 and the memory system 404 can be analogous to the memory system 104/204 illustrated in FIGS. 1 and 2, herein. The processing unit 403 can monitor resource parameters corresponding to execution of workloads running on the mobile computing device 401.

In some embodiments, the processing unit 403 can determine usage patterns associated with the mobile computing device based on the monitored resource parameters corresponding to execution of the applications and determine respective autocorrelation time intervals associated with the determined usage patterns. As described above, the respective autocorrelation time intervals can be determined by the processing unit 403 based on characteristics of particular usage patterns among the determined usage patterns. The processing unit 403 can further determine individual user application parameters corresponding to applications executed by a user of the mobile computing device 401.

Continuing with this example, the processing unit 403 can receive, from the data center 456, aggregate workload parameters 423 corresponding to applications executed by other users connected to the telecommunications network 450 to which the mobile computing device 401 is connected. The processing unit 403 can determine, using the particular usage patterns among the determined usage patterns, the determined individual user application parameters, and/or the received aggregate workload parameters 423, one or more weights for hidden layers of a neural network (e.g., the neural network 322 illustrated in FIG. 3, herein) for the respective autocorrelation time intervals associated with the characteristics of the particular usage pattern.

The processing unit 403 can then allocate computing resources within the mobile computing device 401 for use in execution of subsequent applications based on the determined one or more weights for hidden layers of the neural network. In some embodiments, the processing unit 403 can allocate the computing resources within the mobile computing device 401 prior to execution of a subsequent application based on the determined one or more weights for hidden layers of the neural network.

In some embodiments, the processing unit 403 can determine a latency associated with initiation commands corresponding to applications executed by a user of the mobile computing device and/or or applications executed by other users connected to the telecommunications network 450 to which the mobile device is connected, or both, to determine the respective time intervals associated with the particular usage patterns. For example, the processing unit 403 can determine an amount of time (e.g., a latency) between receipt of a command to initiate an application and commencement of execution of the application. This can allow for the processing unit 403 to determine whether re-allocation of computing resources associated with the mobile computing device 401 can improve application performance and perform operations to re-allocate such resources if it is determined that a re-allocation of computing resources can improve application performance.

As discussed above, the processing unit 403 can set at least four distinct time intervals to determine usage patterns associated with the mobile computing device based on the monitored resource parameters corresponding to execution of the applications. For example, the processing unit 403 can set a first distinct time interval that corresponds to a current term time interval, set a second distinct time interval term that corresponds to a short term time interval, set a third distinct time interval that corresponds to a medium term time interval, and/or set a fourth distinct time interval that corresponds to a long term time interval. In some embodiments, the first distinct time interval corresponds to applications executed within a first time period from receipt of an application initiation indicator, the second distinct time interval corresponds to applications executed within a second time period from receipt of an application initiation indicator, the third distinct time interval corresponds to applications executed within a third time period from receipt of an application initiation indicator, and the fourth distinct time interval corresponds to applications executed within a fourth time period from receipt of an application initiation indicator.

Figure 5:
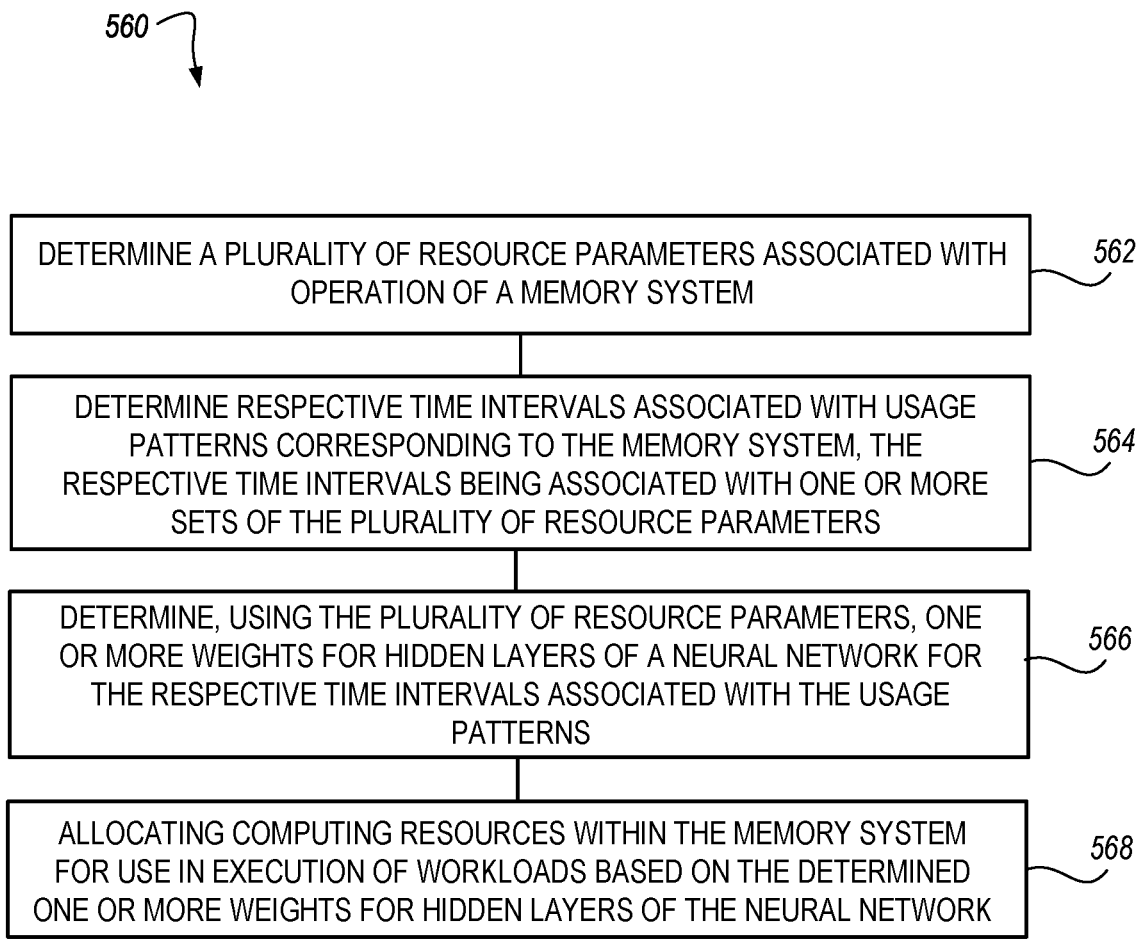
FIG. 5 is a flow diagram representing an example method corresponding to data sequence prediction and resource allocation in accordance with a number of embodiments of the present disclosure.

FIG. 5 is a flow diagram representing an example method 560 corresponding to data sequence prediction and resource allocation in accordance with a number of embodiments of the present disclosure. The method 560 can be performed by processing logic that can include hardware (e.g., processing device, circuitry, dedicated logic, programmable logic, microcode, hardware of a device, integrated circuit, such as the memory controller 108/208 illustrated in FIGS. 1 and 2, herein, etc.), software (e.g., instructions run or executed on a processing device, such as the memory controller 108/208 illustrated in FIGS. 1 and 2, herein), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 562, resource parameters associated with operation of a memory system can be determined. The memory system can be analogous to the memory system 104/204 illustrated in FIGS. 1 and 2, herein. In some embodiments, the resource parameters associated with operation of the memory system can be determined based on characteristics corresponding to execution of workloads by memory devices, such as the memory devices 110-1 to 110-N illustrated in FIG. 1, that are resident on the memory system.

At operation 564, respective time intervals associated with usage patterns corresponding to the memory system can be determined. In some embodiments, the respective time intervals can be associated with one or more sets of the resource parameters. For example, the respective time intervals can include four distinct time intervals, as described above, the method 450 can include determining respective autocorrelation time intervals (described above) for data traffic processed by the memory system as part of determining the respective time intervals.

At operation 566, one or more weights for hidden layers of a neural network for the respective time intervals associated with the usage patterns can be determined using the resource parameters. The neural network can be analogous to the neural network 322 illustrated in FIG. 3, herein. In some embodiments, the method 560 can include determining the one or more weights for the hidden layers of the neural network for each of the four example distinct time intervals described above.

At operation 568, computing resources within the memory system can be allocated for use in execution of workloads based on the determined one or more weights for hidden layers of the neural network. In some embodiments, the method 560 can include allocating the computing resources amongst volatile memory resources and/or non-volatile memory resources, or both, associated with the memory system, as described herein. As described above, the computing resources within the memory system can be pre-allocated for use in execution of future workloads based on the determined weights for hidden layers of the neural network and/or based on weighted outputs (W1 339-1, W2 339-2, WQ 339-Q, etc.) of the neural network as described in connection with FIG. 3, herein. Accordingly, in some embodiments, the method 450 can include proactively allocating the computing resources within the memory system for use in execution of future workloads based on the determined one or more weights for hidden layers of the neural network.

In some embodiments, the method 560 can include determining the resource parameters associated with operation of the memory system using received individual user workload parameters and received aggregate workload parameters corresponding to other users of a cloud network to which the memory system is communicatively coupled. The received individual user workload parameters can be analogous to the user workload 321 described in connection with FIG. 3, while the received aggregate workload parameters corresponding to other users of a cloud network to which the memory system is communicatively coupled can correspond to the aggregate cloud workload 323/423 described in connection with FIGS. 3 and 4, herein.

The method 560 can include determining a command latency associated with commands received to a front-end portion of the memory system as part of determining the respective time intervals associated with the usage patterns corresponding to the memory system, as describe above. In some embodiments, the method 560 can include performing the operations described herein locally within the memory system and/or within the memory device(s). For example, the method 560 can include performing at least a portion of the operations described herein without encumbering a host computing system (e.g., the host 102 illustrated in FIG. 1, herein) and/or other circuitry external to the memory system. In some embodiments, the method 560 can include performing the operations described herein based, at least in part, on control signaling generated by hardware circuitry (e.g., the memory controller 108/208 illustrated in FIGS. 1 and 2, herein) in the absence of signaling and/or additional signaling (e.g., signaling generated subsequent to signaling that is indicative of initiation of the operations described herein) that is generated by external circuitry, such as a host computing system.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    determining, by a memory system, a plurality of resource parameters associated with execution of applications involving the memory system based, at least in part, on characteristics corresponding to execution of the applications by memory devices resident on the memory system, the characteristics corresponding to execution of the applications including characteristics selected from the group including: types of the applications executed, power consumption associated with execution of the applications, and frequency of execution of the applications;
    determining respective time intervals associated with usage patterns corresponding to the memory system, wherein the respective time intervals are associated with one or more sets of the plurality of resource parameters, and wherein the respective time intervals each correspond to a different time duration between receipt of a respective command to initiate a particular application of the applications and commencement of execution of the particular application;
    determining, using the plurality of resource parameters, one or more weights for hidden layers of a neural network for the respective time intervals associated with the usage patterns;
    allocating computing resources within the memory system for use in execution of future applications based on the determined one or more weights for hidden layers of the neural network; and
    executing the future applications using the allocated computer resources.

2. The method of claim 1, further comprising determining respective autocorrelation time intervals for data traffic processed by the memory system as part of determining the respective time intervals.

3. The method of claim 1, further comprising allocating the computing resources amongst a plurality of volatile memory resources or a plurality of non-volatile memory resources, or both, associated with the memory system.

4. The method of claim 1, further comprising determining the plurality of resource parameters associated with execution of applications involving the memory system using received individual user workload parameters and received aggregate workload parameters corresponding to other users of a cloud network to which the memory system is communicatively coupled.

5. The method of claim 1, further comprising determining a command latency associated with commands received to a front-end portion of the memory system as part of determining the respective time intervals associated with the usage patterns corresponding to the memory system.

6. The method of claim 1, wherein the respective time intervals comprise four distinct time intervals, and wherein the method further comprises determining the one or more weights for the hidden layers of the neural network for each of the four distinct time intervals.

7. An apparatus, comprising:
a memory system comprising a plurality of memory devices; and
a processing unit resident on the memory system and communicatively coupled to each of the memory devices, wherein the processing unit is configured to:
monitor a plurality of resource parameters corresponding to execution of applications involving the memory system, the plurality of resource parameters determined based, at least in part on characteristics corresponding to execution of the applications by the plurality of memory devices, the characteristics corresponding to execution of the applications including characteristics selected from the group including: types of the applications executed, power consumption associated with execution of the applications, and frequency of execution of the applications;
determine usage patterns associated with the memory system based on the plurality of monitored resource parameters corresponding to execution of the applications;
determine respective time intervals associated with the determined usage patterns, wherein the respective time intervals are associated with particular resource parameters among the plurality of monitored resource parameters, and wherein the respective time intervals each correspond to a different time duration between receipt of a respective command to initiate a particular application of the applications and commencement of execution of the particular application;
determine, using at least one monitored resource parameter among the plurality of monitored resource parameters, or the determined usage patterns, or both, one or more weights for hidden layers of a neural network for the respective time intervals associated with the determined usage patterns;
allocate computing resources within the memory system for use in execution of subsequent applications based on the determined one or more weights corresponding to the hidden layers of the neural network; and
execute the subsequent applications using the allocated computing resources.

8. The apparatus of claim 7, wherein the plurality of memory devices includes at least one volatile memory device and at least one non-volatile memory device, and wherein the processing unit is further configured to allocate computing resources amongst the at least one volatile memory device and the at least one non-volatile memory device as part of allocation of the computing resources for use in execution of the subsequent applications.

9. The apparatus of claim 7, wherein the memory system and the processing unit are resident on a mobile computing device.

10. The apparatus of claim 7, wherein the processing unit is further configured to:
determine individual user application parameters corresponding to applications executed by a user of the memory system;
receive aggregate application parameters corresponding to applications executed by other users connected to a network to which the memory system is connected; and
determine characteristics of the plurality of resource parameters using the determined individual user application parameters and the received aggregate application parameters.

11. The apparatus of claim 7, wherein the processing unit is configured to determine a command latency associated with commands corresponding to execution of the applications to determine the respective time intervals associated with the determined usage patterns.

12. The apparatus of claim 7, wherein the processing unit is configured to determine at least three distinct time intervals to determine usage patterns associated with the memory system based on the plurality of monitored resource parameters corresponding to execution of the applications, and wherein:
a first distinct time interval corresponds to a current term,
a second distinct term corresponds to a short term, and
a third distinct term corresponds to a medium term or a long term.

13. The apparatus of claim 7, wherein the neural network is a recurrent neural network.

14. A system, comprising:
a telecommunications network comprising a base station and a data center; and
a mobile computing device communicatively coupled to the base station, the mobile computing device comprising a memory system and a processing unit resident thereon, wherein the processing unit is configured to:
monitor a plurality of resource parameters corresponding to execution of applications running on the mobile computing device, the plurality of resource parameters determined based, at least in part on characteristics corresponding to execution of the applications by memory devices resident on the memory system, the characteristics corresponding to execution of the applications including characteristics selected from the group including: types of the applications executed, power consumption associated with execution of the applications, and frequency of execution of the applications;
determine usage patterns associated with the mobile computing device based on the plurality of monitored resource parameters corresponding to execution of the applications;
determine respective autocorrelation time intervals associated with the determined usage patterns, wherein the respective autocorrelation time intervals are determined by the processing unit based on characteristics of particular usage patterns among the determined usage patterns, and wherein the respective autocorrelation time intervals each correspond to a different time duration between receipt of a respective command to initiate a particular application of the applications and commencement of execution of the particular application;

determine individual user application parameters corresponding to applications executed by a user of the mobile computing device;

receive, from the data center, aggregate workload parameters corresponding to applications executed by other users connected to the telecommunications network to which the mobile computing device is connected;

determine, using the particular usage patterns among the determined usage patterns, the determined individual user application parameters, or the received aggregate application parameters, one or more weights for hidden layers of a neural network for the respective autocorrelation time intervals associated with the characteristics of the particular usage pattern;

allocate computing resources within the mobile computing device for use in execution of subsequent applications based on the determined one or more weights for hidden layers of the neural network; and execute the subsequent applications using the allocated computing resources.

15. The system of claim 14, wherein the processing unit is configured to determine a latency associated with initiation commands corresponding to applications executed by a user of the mobile computing device or applications executed by other users connected to the telecommunications network to which the mobile device is connected, or both, to determine the respective time intervals associated with the particular usage patterns.

16. The system of claim 14, wherein the processing unit is configured to set at least four distinct time intervals to determine usage patterns associated with the mobile computing device based on the plurality of monitored resource parameters corresponding to execution of the applications, and wherein:

a first distinct time interval corresponds to a current term time interval, a second distinct time interval term corresponds to a short term time interval, a third distinct time interval corresponds to a medium term time interval, and a fourth distinct time interval corresponds to a long term time interval.

17. The system of claim 16, wherein:

the first distinct time interval corresponds to applications executed within a first time period from receipt of an application initiation indicator, the second distinct time interval corresponds to applications executed within a second time period from receipt of an application initiation indicator, the third distinct time interval corresponds to applications executed within a third time period from receipt of an application initiation indicator, and the fourth distinct time interval corresponds to applications executed within a fourth time period from receipt of an application initiation indicator.

18. The system of claim 14, wherein the processing unit is configured to allocate the computing resources within the mobile computing device prior to execution of a subsequent application based on the determined one or more weights for hidden layers of the neural network.

* * * * *